United States Patent
Yoo et al.

(10) Patent No.: US 8,329,840 B2
(45) Date of Patent: Dec. 11, 2012

(54) PHOTO-REACTIVE NORBORNENE-BASED COPOLYMER, A METHOD OF PREPARING THE SAME, AND AN ALIGNMENT LAYER INCLUDING THE SAME

(75) Inventors: Dong-Woo Yoo, Daejeon (KR);
Sung-Ho Chun, Daejeon (KR);
Young-Chul Won, Daejeon (KR);
Dai-Seung Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/177,408

(22) Filed: Jul. 6, 2011

(65) Prior Publication Data

US 2012/0010380 A1    Jan. 12, 2012

(30) Foreign Application Priority Data

Jul. 7, 2010   (KR) .......... 10-2010-0065567
Apr. 12, 2011  (KR) .......... 10-2011-0033868

(51) Int. Cl.
*C08F 236/20* (2006.01)
*C08L 47/00* (2006.01)
*C09K 19/52* (2006.01)
*C08F 4/80* (2006.01)

(52) U.S. Cl. ......... 526/281; 428/1.2; 522/112; 524/517; 524/518; 526/145; 526/172; 526/239; 526/256; 526/258; 526/259; 526/270; 526/277; 526/278; 526/279

(58) Field of Classification Search .................. 526/242, 526/172, 281, 145, 239, 256, 258, 259, 270, 526/277, 278, 279; 522/112; 428/1.2; 524/517, 518

See application file for complete search history.

(56) References Cited

U.S. PATENT DOCUMENTS

| | | | |
|---|---|---|---|
| 5,538,823 A | 7/1996 | Park et al. | |
| 6,174,649 B1 | 1/2001 | Park et al. | |
| 7,037,993 B2 | 5/2006 | Taguchi et al. | |
| 2005/0037289 A1 | 2/2005 | Carr et al. | |
| 2006/0159865 A1* | 7/2006 | Kim et al. | 428/1.2 |
| 2006/0160970 A1 | 7/2006 | Kim et al. | |
| 2008/0319157 A1 | 12/2008 | Chun et al. | |
| 2010/0076166 A1* | 3/2010 | Kim et al. | 526/108 |
| 2010/0182547 A1* | 7/2010 | Ryu et al. | 349/96 |

FOREIGN PATENT DOCUMENTS

| | | |
|---|---|---|
| JP | 06-223153 | 10/1987 |
| KR | 10-0561068 | 3/2006 |
| KR | 10-2006-0084811 A | 7/2006 |
| KR | 10-1999-0087581 | 9/2006 |
| KR | 10-2008-0086408 A | 9/2008 |
| KR | 10-2009-0047720 | 5/2009 |
| KR | 10-2009-0079842 A | 7/2009 |
| KR | 10-2010-0021751 A | 2/2010 |
| KR | 10-0948708 | 3/2010 |
| WO | WO 97/33198 | 9/1997 |

* cited by examiner

*Primary Examiner* — Fred M Teskin
(74) *Attorney, Agent, or Firm* — McKenna Long & Aldridge LLP

(57) ABSTRACT

The present invention relates to a photo-reactive norbornene-based copolymer which has superior miscibility to various organic solvents or additives while exhibiting superior liquid crystal alignment property and can be preferably used to an alignment layer of liquid crystal display device, a method of preparing the same, and an alignment layer including the same.

16 Claims, 1 Drawing Sheet

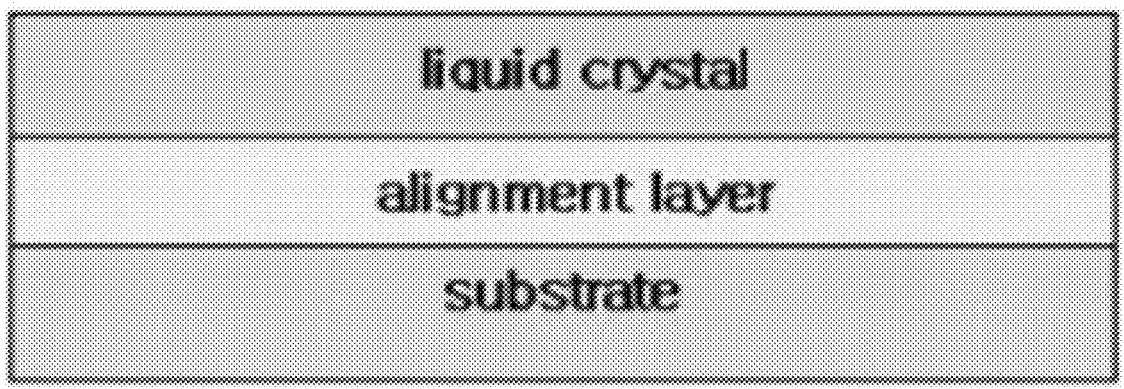

PHOTO-REACTIVE NORBORNENE-BASED COPOLYMER, A METHOD OF PREPARING THE SAME, AND AN ALIGNMENT LAYER INCLUDING THE SAME

This application claims priority to Korean Application Nos. 10-2010-0065567, filed on Jul. 7, 2010, and 10-2011-0033868, filed Apr. 12, 2011, which are both hereby incorporated by reference in their entirety.

BACKGROUND OF THE INVENTION (a) Field of the Invention

The present invention relates to a photo-reactive norbornene-based copolymer and a method of preparing the same. More specifically, the present invention relates to a photo-reactive norbornene-based copolymer which has superior miscibility to various organic solvents or additives while exhibiting superior liquid crystal alignment property and can be preferably used to an alignment layer of liquid crystal display device, a method of preparing the same, and an alignment layer including the same.

(b) Description of the Related Art

Recently, as the liquid crystal display (LCD) is enlarged and the use is gradually extended from a personal use such as mobile phone or lap-top computer to a family use such as wall-mountable TV and the like, high-definition, high-fidelity, and wide viewing angle are being required to the LCD. Particularly, thin film transistor-liquid crystal display (TFT-LCD) which is operated by a thin film transistor can realize moving images of high-definition because it operates each pixel independently and shows very good response time of liquid crystal, and thus the application range thereof is gradually extended.

In order to use the liquid crystal as an optical switch in the TFT-LCD, the liquid crystal on the innermost thin film transistor layer of the display cell must be pre-tilted in a certain direction, and the alignment layer is used for this.

For the liquid crystal alignment, a rubbing process of coating a heat-resistant polymer such as polyimide and the like on a transparent glass so as to form a polymer alignment layer, and rubbing the alignment layer with a rotating roller which is rolled up in a rubbing cloth such as nylon or rayon by rotating the roller with high speed so as to align the layer has been applied before.

However, the rubbing process may give mechanical scratches on the liquid crystal alignment layer or generate high static, and thus it may destroy the TFT. Furthermore, the fine fibers from the rubbing cloth generate defects and it becomes an obstacle to the improvement of production yield.

A newly invented liquid crystal alignment method for overcoming the problem of the rubbing process and achieving an innovation in the side of production is a liquid crystal alignment by light such as ultra-violet (UV) (hereinafter 'photo-alignment').

The photo-alignment means the mechanism of forming a photo-polymerizable liquid crystal alignment layer that photo-sensitive groups bonded to a certain photo-reactive polymer are photo-reacted by a linear polarized UV, the main chain of the polymer is aligned in a certain direction during the process, and the liquid crystal is aligned finally.

Representative examples of the photo-alignment are the photo-alignment process according to photo-polymerization published by M. Schadt et al. (Jpn. J. Appl. Phys., Vol 31., 1992, 2155), Dae S. Kang et al. (U.S. Pat. No. 5,464,669), and Yuriy Reznikov (Jpn. J. Appl. Phys. Vol. 34, 1995, L1000). The photo-alignment polymer used in the patent and articles are mostly a polycinnamate-based polymer such as poly(vinyl cinnamate) (PVCN) or poly(vinyl methoxycinnamate) (PVMC). In the case of photo-aligning the polymer, the double bonds of the cinnamate form a cyclobutane through a [2+2] cycloaddition reaction by a UV radiation, anisotropy appears and the liquid crystal molecules are arranged in one direction according to this, and the alignment of liquid crystal is induced.

In addition to, Japan Patent Publication No. Hei 11-181127 discloses a polymer having a side chain including photo-sensitive group such as cinnamic acid group in the main chain of acrylate or methacrylate, and an alignment layer including the same. Furthermore, Korea Patent Publication No. 2002-0006819 discloses the use of an alignment layer made of polymethacrylic polymer.

However, the prior photo-alignment polymers disclosed above had a disadvantage of that the stability of the alignment layer was deteriorated due to low thermal stability of the polymer main chain, or the liquid crystal alignment was insufficient because the photo-reactive functional group was not sufficient. Furthermore, the alignment layer is generally formed from a composition for alignment including a binder resin and an organic solvent in addition to the photo-alignment polymer, the photo-alignment polymers known before were poor in the solubility to the organic solvent or the miscibility to the binder resin, and there were many cases of that the coating property of the composition for alignment decreased, or various coating methods or additives are hard to be applied to the composition.

SUMMARY OF THE INVENTION

It is an aspect of the present invention to provide a photo-reactive norbornene-based copolymer which has superior miscibility to various organic solvents or additives while exhibiting superior liquid crystal alignment property and can be preferably used as a photo-alignment polymer, and a method of preparing the same.

It is another aspect of the present invention to provide an alignment layer including the photo-reactive norbornene-based copolymer as a photo-alignment polymer, and showing excellent adhesive strength to a substrate and coating property in company with superior alignment property.

BRIEF DESCRIPTION OF THE DRAWINGS

The drawing illustrates a structural example of conventional alignment layer briefly.

DETAILED DESCRIPTION OF THE EMBODIMENTS

The present invention provides a photo-reactive norbornene-based copolymer, including the following compounds of Chemical Formulae 1 and 2 as monomers:

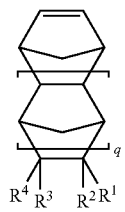

[Chemical Formula 1]

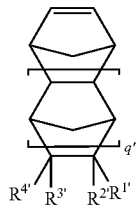

[Chemical Formula 2]

in Chemical Formulae 1 and 2, q and q' are integers of 0 to 4, at least one of R1, R2, R3, and R4 is a radical selected from the group consisting of the compounds represented by the following Chemical Formulae 1a and 1b, at least one of R1', R2', R3', and R4' is a radical represented by the following Chemical Formula 2a, R1 to R4, and R1' to R4' except the radicals of Chemical Formulae 1a, 1b, and 2a are same or different each other, and independently selected from the group consisting of hydrogen; a halogen; a substituted or unsubstituted $C_1$-$C_{20}$ linear or branched alkyl; a substituted or unsubstituted $C_2$-$C_{20}$ linear or branched alkenyl; a substituted or unsubstituted $C_2$-$C_{20}$ linear or branched alkynyl; a substituted or unsubstituted $C_3$-$C_{12}$ cycloalkyl; a substituted or unsubstituted $C_6$-$C_{40}$ aryl; and a polar group including at least one selected from oxygen, nitrogen, phosphorus, sulfur, silicon, and boron, and when R1 to R4, and R1' to R4' are not hydrogen; halogen; or polar group, at least one combination selected from the group consisting of R1 and R2, R1' and R2', R3 and R4, and R3' and R4' may be connected each other so as to form a $C_1$-$C_{10}$ alkylidene group; or R1 or R2 may be connected to any one of R3 and R4, or R1' or R2' may be connected to any one of R3' and R4' so as to form a $C_4$-$C_{12}$ saturated or unsaturated aliphatic ring or a $C_6$-$C_{24}$ aromatic ring:

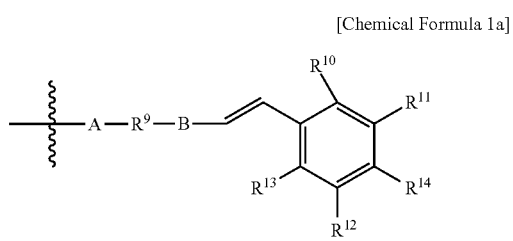

[Chemical Formula 1a]

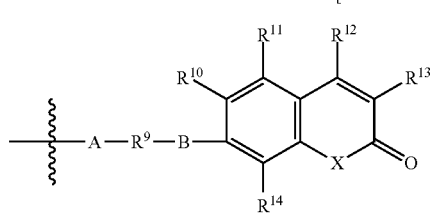

[Chemical Formula 1b]

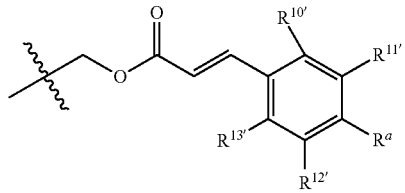

[Chemical Formula 2a]

in Chemical Formulae 1a, 1b, and 2a,

A is a chemical bond, oxygen, sulfur, or —NH—,

B is selected from the group consisting of a chemical bond, a substituted or unsubstituted $C_1$-$C_{20}$ alkylene, a carbonyl group, a carboxyl group, an ester, a substituted or unsubstituted $C_6$-$C_{40}$ arylene, and a substituted or unsubstituted $C_6$-$C_{40}$ hetero arylene, X is oxygen or sulfur;

R9 is selected from the group consisting of a chemical bond, a substituted or unsubstituted $C_1$-$C_{20}$ alkylene, a substituted or unsubstituted $C_2$-$C_{20}$ alkenylene, a substituted or unsubstituted $C_3$-$C_{12}$ cycloalkylene; a substituted or unsubstituted $C_6$-$C_{40}$ arylene; a substituted or unsubstituted $C_7$-$C_{15}$ aralkylene, and a substituted or unsubstituted $C_2$-$C_{20}$ alkynylene, Ra is hydrogen or methoxy, at least one of R10, R11, R12, R13, and R14 is a halogen or a halogen-substituted $C_1$-$C_{20}$ alkyl, and the rest of R10 to R14, and R10' to R13' are same or different each other, and independently selected from the group consisting of a substituted or unsubstituted $C_1$-$C_{20}$ alkyl; a substituted or unsubstituted $C_1$-$C_{20}$ alkoxy; a substituted or unsubstituted $C_6$-$C_{30}$ aryloxy; a substituted or unsubstituted $C_6$-$C_{40}$ aryl; a $C_6$-$C_{40}$ hetero aryl including a hetero atom of Group 14, 15, or 16; and a substituted or unsubstituted $C_6$-$C_{40}$ alkoxyaryl.

The present invention also provides a method of preparing the photo-reactive norbornene-based copolymer, including the step of polymerizing the monomers of Chemical Formulae 1 and 2 in the presence of a catalyst composition including a procatalyst including a transition metal of Group 10 and a cocatalyst.

The present invention also provides an alignment layer, including the photo-reactive norbornene-based copolymer.

The photo-reactive norbornene-based copolymer according to the present invention includes a repeating unit having halogen-substituted group, and a repeating unit having methoxy or hydrogen functional group. Due to the repeating unit having halogen-substituted group, the copolymer makes it possible to provide the alignment layer exhibiting good liquid crystal alignment property and alignment speed, and improved adhesive strength to a substrate. Furthermore, due to the repeating unit having methoxy group and the like, the copolymer can show superior miscibility to various organic solvents or additives, and it makes the copolymer to be applied to various alignment compositions and coating method, and secures superior coating property of the alignment composition.

Therefore, the copolymer may be preferably applied to various alignment compositions which are applied to various liquid crystal display devices, and the alignment layer formed therefrom as a photo-alignment polymer, and the alignment layer including the same can show superior properties.

Hereinafter, the photo-reactive norbornene-based copolymer, a method of preparing the same, and an alignment layer according to the embodiments of the present invention is explained in more detail.

According to one embodiment of the present invention, a photo-reactive norbornene-based copolymer having a specific structure is provided. The photo-reactive norbornene-based copolymer includes the following compounds of Chemical Formulae 1 and 2 as the monomers:

[Chemical Formula 1]

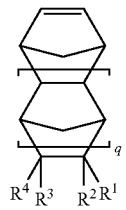

[Chemical Formula 2]

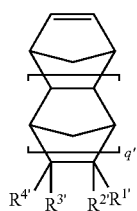

in Chemical Formulae 1 and 2, q and q' are integers of 0 to 4, at least one of R1, R2, R3, and R4 is a radical selected from the group consisting of the compounds represented by the following Chemical Formulae 1a and 1b, at least one of R1', R2', R3', and R4' is a radical represented by the following Chemical Formula 2a, R1 to R4, and R1' to R4' except the radicals of Chemical Formulae 1a, 1b, and 2a are same or different each other, and independently selected from the group consisting of hydrogen; a halogen; a substituted or unsubstituted $C_1$-$C_{20}$ linear or branched alkyl; a substituted or unsubstituted $C_2$-$C_{20}$ linear or branched alkenyl; a substituted or unsubstituted $C_2$-$C_{20}$ linear or branched alkynyl; a substituted or unsubstituted $C_3$-$C_{12}$ cycloalkyl; a substituted or unsubstituted $C_6$-$C_{40}$ aryl; and a polar group including at least one selected from oxygen, nitrogen, phosphorus, sulfur, silicon, and boron, and when R1 to R4, and R1' to R4' are not hydrogen; halogen; or polar group, at least one combination selected from the group consisting of 121 and R2, R1' and R2', R3 and R4, and R3' and R4' may be connected each other so as to form a $C_1$-$C_{10}$ alkylidene group; or R1 or R2 may be connected to any one of R3 and R4, or R1' or R2' may be connected to any one of R3' and R4' so as to form a $C_4$-$C_{12}$ saturated or unsaturated aliphatic ring or a $C_6$-$C_{24}$ aromatic ring:

[Chemical Formula 1a]

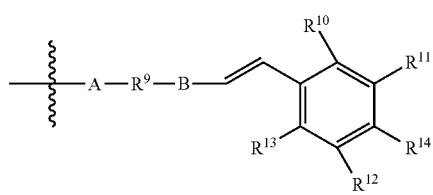

[Chemical Formula 1b]

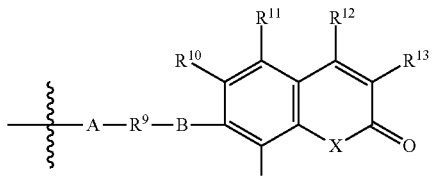

[Chemical Formula 2a]

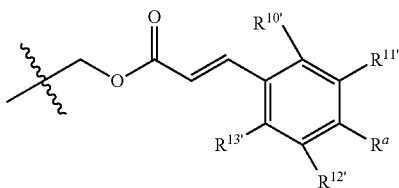

in Chemical Formulae 1a, 1b, and 2a,

A is a chemical bond, oxygen, sulfur, or —NH—,

B is selected from the group consisting of a chemical bond, a substituted or unsubstituted $C_1$-$C_{20}$ alkylene, a carbonyl group, a carboxyl group, an ester, a substituted or unsubstituted $C_6$-$C_{40}$ arylene, and a substituted or unsubstituted $C_6$-$C_{40}$ hetero arylene, X is oxygen or sulfur, R9 is selected from the group consisting of a chemical bond, a substituted or unsubstituted $C_1$-$C_{20}$ alkylene, a substituted or unsubstituted $C_2$-$C_{20}$ alkenylene, a substituted or unsubstituted $C_3$-$C_{12}$ cycloalkylene; a substituted or unsubstituted $C_6$-$C_{40}$ arylene; a substituted or unsubstituted $C_7$-$C_{15}$ aralkylene, and a substituted or unsubstituted $C_2$-$C_{20}$ alkynylene, Ra is hydrogen or methoxy, at least one of R10, R11, R12, R13, and R14 is a halogen or a halogen-substituted $C_1$-$C_{20}$ alkyl, and the rest of R10 to R14, and R10' to R13' are same or different each other, and independently selected from the group consisting of a substituted or unsubstituted $C_1$-$C_{20}$ alkyl; a substituted or unsubstituted $C_1$-$C_{20}$ alkoxy; a substituted or unsubstituted. $C_6$-$C_{30}$ aryloxy; a substituted or unsubstituted $C_6$-$C_{40}$ aryl; a $C_6$-$C_{40}$ hetero aryl including a hetero atom of Group 14, 15, or 16; and a substituted or unsubstituted $C_6$-$C_{40}$ alkoxyaryl.

Such photo-reactive norbornene-based copolymer includes the compound of Chemical Formula 1 having halogen substituent and the compound of Chemical Formula 2 having the functional group of methoxy or hydrogen at Ra position as the main monomers. Such norbornene-based copolymer shows superior thermal stability in comparison with prior known acryl-based photo-reactive polymers, because the norbornene copolymer has a hard structure and its glass transition temperature (Tg) is relatively high, 300° C. or more, and preferably 300 to 350° C. Furthermore, as the monomers include the cinnamate structure showing photo-reactivity, the norbornene-based copolymer can show superior photo-reactivity.

As supported by the Experimental Examples disclosed below, the norbornene-based copolymer shows more excellent photo-reactivity and can show superior liquid crystal alignment property in the alignment layer, because of the monomer having halogen substituent included therein. It seems because the halogen substituent can cause the ingredient gradation in the alignment layer more strongly. The ingredient gradation means the phenomenon of that the degree of distribution of the binder resin and the photo-alignment polymer differs from each other according to the distance from the substrate. For example, when the composition for alignment including the binder resin and the photo-alignment polymer is coated on the substrate and cured by a UV ray so as to form the alignment layer, more binder resins may exist near the substrate and more photo-alignment polymer may exist as distance from the substrate increases, the reverse case is also possible. By the way, the norbornene-based copolymer may cause the ingredient gradation phenomenon more strongly when it includes the monomer including the halogen substituent (for example, fluorine-containing substituent). For example, if the polarity of the substrate is high, more binder resin may exist near the substrate and more norbornene-based copolymer may exist on the far side of the substrate (for example, the side contacting to the liquid crystal in the structure of the drawing) due to the repulsive force. According to this phenomenon, it is possible to make much more photo-alignment polymer (namely, the norbornene-based copolymer) exist near to the liquid crystal, and thus the alignment layer including the norbornene copolymer can show superior liquid crystal alignment property.

In addition to, since the norbornene-based copolymer includes the monomer having the functional group of methoxy or hydrogen, it can show superior solubility to various organic solvents and excellent miscibility to various binder resins. According to this, the norbornene-based copolymer can be applied to various compositions for alignment including various organic solvents, binder resins, or additives, and can form the alignment layer by using the same with various methods. Moreover, it is recognized that the composition for alignment including the norbornene-based copolymer can show more excellent adhesive strength to the substrate because the copolymer includes the monomer having the functional group of methoxy or hydrogen. Therefore, the norbornene-based copolymer makes it possible to provide the composition for alignment which is properly applied to various LCD devices, and the alignment layer formed from the composition also can show superior properties of liquid crystal alignment, adhesive strength, and coatability, due to the superior coatability and adhesive strength of the composition and the excellent photo-reactivity of the norbornene-based copolymer.

Hereinafter, the norbornene-based copolymer is explained in more detail.

In the monomers of Chemical Formulae 1 and 2 forming the norbornene-based copolymer, the polar functional group may be selected from the following functional groups, and it may be selected from various other polar functional groups including at least one of oxygen, nitrogen, phosphorus, sulfur, silicon, and boron except the following polar functional groups:

—$R_5OR_6$, —$OR_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$, —$R_5OC(O)R_6$, —$(R_5O)_p$—$OR_6$, —$(OR_5)_p$—$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$—, —$R_5C(=S)SR_6$, —$R_5SO_3R_6$, —$SO_3R_6$, —$R_5N=C=S$, —$N=C=S$, —$NCO$, —$R_5$—$NCO$, —$CN$, —$R_5CN$, —$NNC(=S)R_6$, —$R_5NNC(=S)R_6$, —$NO_2$, —$R_5NO_2$,

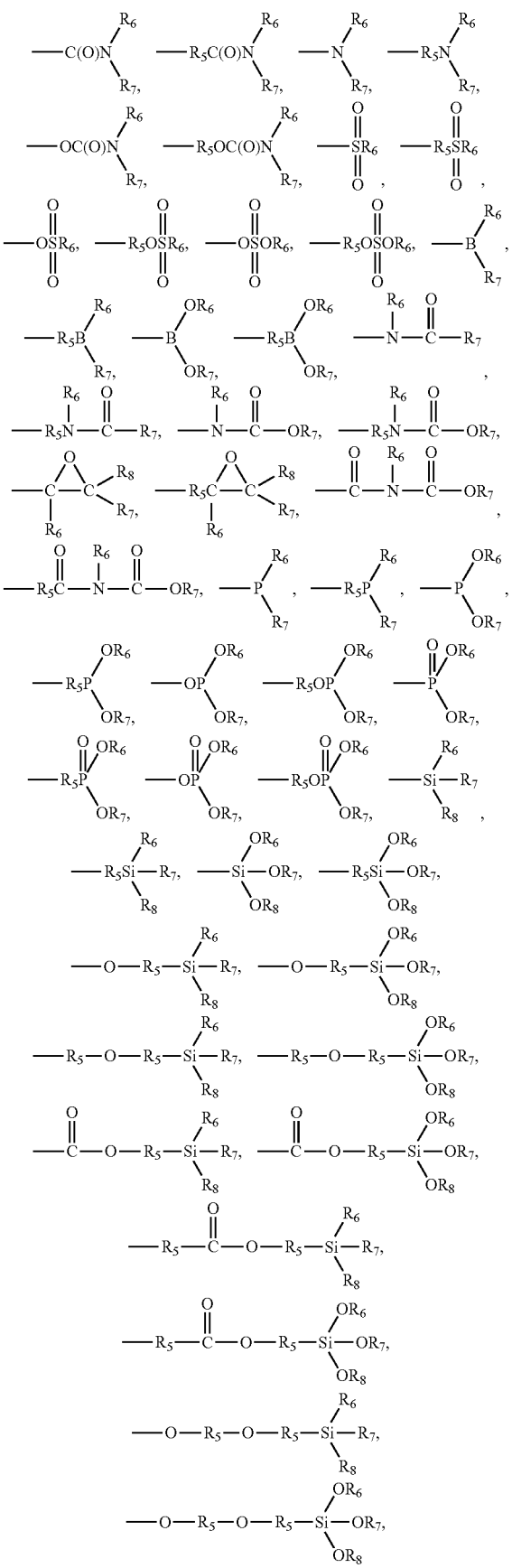

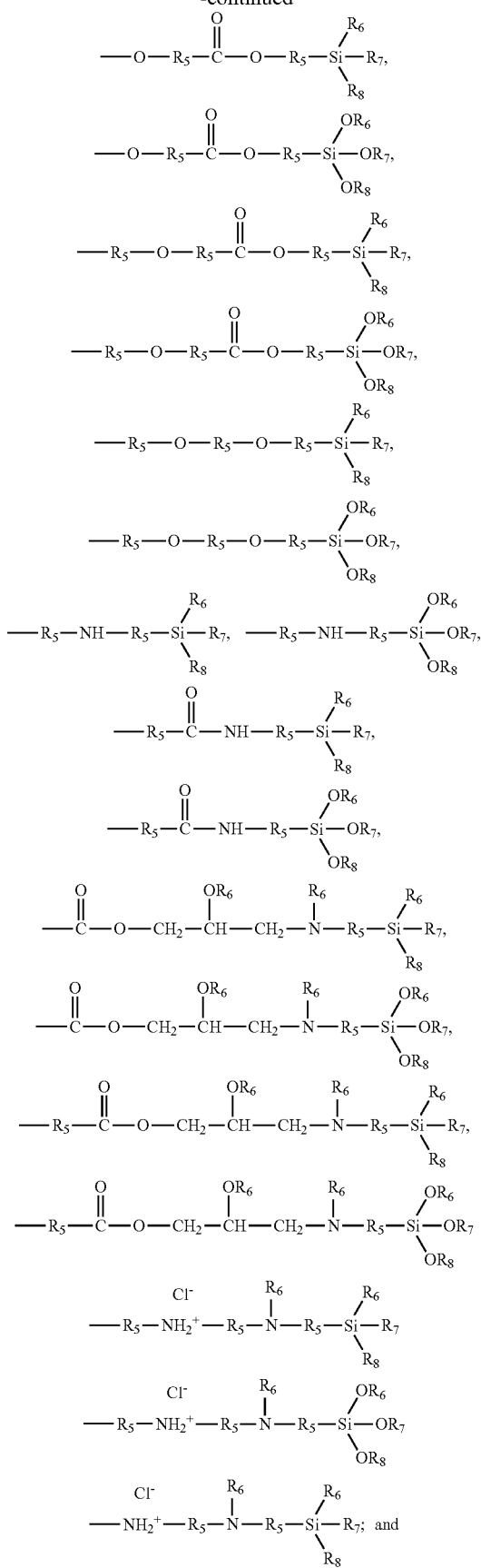

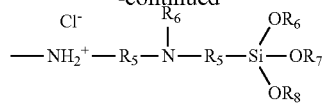

in the polar functional groups, p is independently an integer of 1 to 10,

R5 is a substituted or unsubstituted $C_1$-$C_{20}$ linear or branched alkylene; a substituted or unsubstituted $C_2$-$C_{20}$ linear or branched alkenylene; a substituted or unsubstituted $C_2$-$C_{20}$ linear or branched alkynylene; a substituted or unsubstituted $C_3$-$C_{12}$ cycloalkylene; a substituted or unsubstituted $C_6$-$C_{40}$ arylene; a substituted or unsubstituted $C_1$-$C_{20}$ carbonyloxylene; or a substituted or unsubstituted $C_1$-$C_{20}$ alkoxylene, and R6, R7, and R8 are independently selected from the group consisting of hydrogen; a halogen; a substituted or unsubstituted $C_1$-$C_{20}$ linear or branched alkyl; a substituted or unsubstituted $C_2$-$C_{20}$ linear or branched alkenyl; a substituted or unsubstituted $C_2$-$C_{20}$ linear or branched alkynyl; a substituted or unsubstituted $C_3$-$C_{12}$ cycloalkyl; a substituted or unsubstituted $C_6$-$C_{40}$ aryl; a substituted or unsubstituted $C_1$-$C_{20}$ alkoxy; and a substituted or unsubstituted $C_1$-$C_{20}$ carbonyloxy.

Furthermore, the halogen in Chemical Formulae 1a and 1b, for example the halogen included in at least one of R10 to R14, may be fluorine, chlorine, bromine, or iodine, and may preferably be fluorine. When the halogen is fluorine, the photo-reactivity of the norbornene-based copolymer or the liquid crystal alignment property of the alignment layer including the same may be improved more and more.

And, in the monomers included in the norbornene-based copolymer, it is more preferable that R1 in Chemical Formula 1 and R1' in Chemical Formula 2 are represented by Chemical Formula 1a and Chemical Formula 1b respectively, and at least one of R10, R11, R12, R13, and R14 in Chemical Formula 1a is fluorine, or a fluorine-substituted $C_1$-$C_{20}$ alkyl. According to this, overall properties such as the liquid crystal alignment property of the alignment layer may be improved more and more.

Furthermore, in the monomers included in the norbornene-based copolymer, the substituted or unsubstituted $C_6$-$C_{40}$ aryl; or the $C_6$-$C_{40}$ hetero aryl including the hetero atom of Group 14, 15, or 16 may be selected from; the group consisting of the following functional groups, and it may be various other aryl or hetero aryl groups except the following polar functional groups:

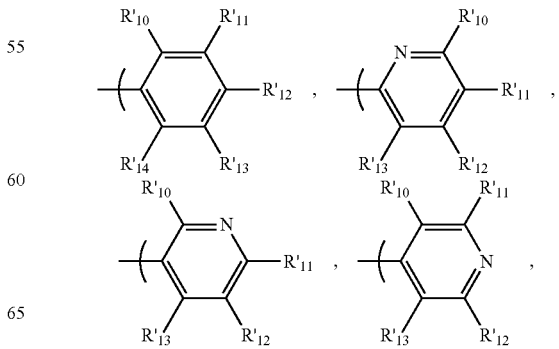

-continued

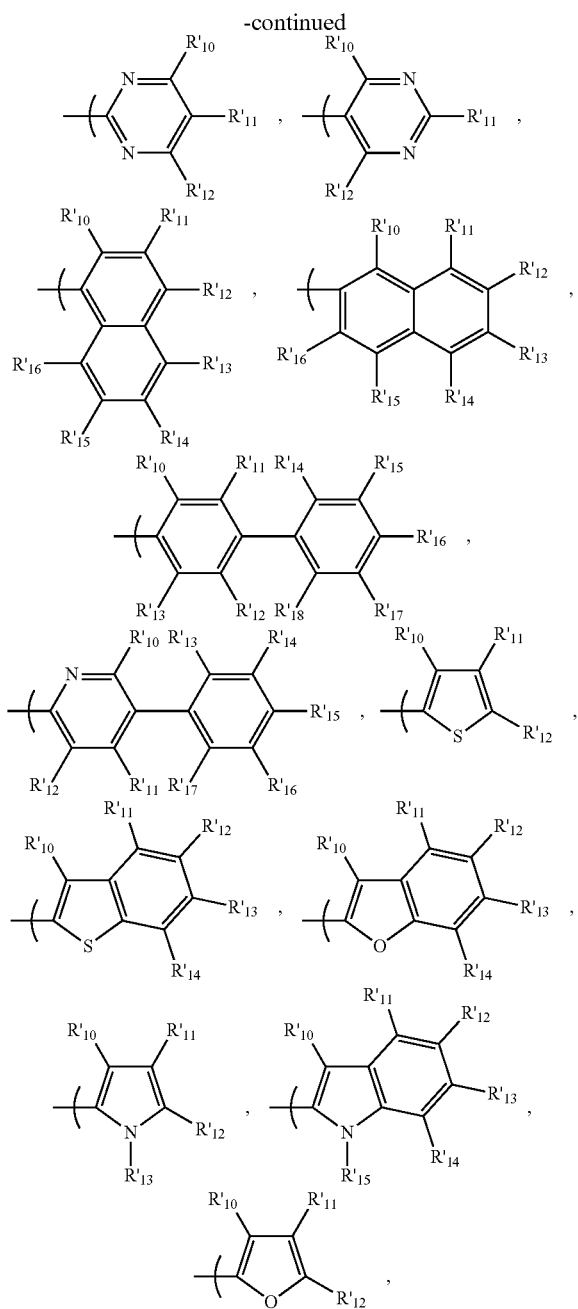

in the functional groups, R'10 to R'18 are same or different each other, and the rests are independently selected from the group consisting of a substituted or unsubstituted $C_1$-$C_{20}$ linear or branched alkyl; a substituted or unsubstituted $C_1$-$C_{20}$ alkoxy; a substituted or unsubstituted $C_6$-$C_{30}$ aryloxy; and a substituted or unsubstituted $C_6$-$C_{40}$ aryl.

And, the norbornene-based copolymer of one embodiment of the invention may includes the monomers of Chemical Formulae 1 and 2 with mole ratio of 3:97 to 97:3, preferably 5:95 to 95:5, and more preferably 30:70 to 70:30. Since the mole ratio of each monomer is optimized, it is possible to optimize the solubility to various solvents, the photo-reactivity, and the liquid crystal alignment property of the copolymer, and the coatability and the adhesive strength of the composition for alignment including the same at the same time.

Meanwhile, the norbornene-based copolymer may include the repeating units derived from the monomers of Chemical Formulae 1 and 2, for example the repeating units of Chemical Formulae 3 and 4:

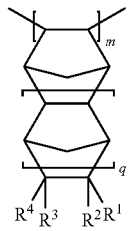

[Chemical Formula 3]

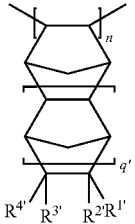

[Chemical Formula 4]

wherein, m and n are independently 50 to 5000, q, q', R1 to R4, and R1' to R4' are same as defined in Chemical Formulae 1 and 2.

Since the details about the substituent of the repeating units of Chemical Formulae 3 and 4, proper mole ratio, and so on are same as above monomers of Chemical Formulae 1 and 2, the detailed explanations are omitted here.

Furthermore, the norbornene-based copolymer may further include additional repeating units, for example the repeating units derived from various olefin-based or cyclic olefin-based monomers, in addition to above repeating units, and it may be formed into a copolymer of various types.

The norbornene-based copolymer may have the weight average molecular weight of 10000 to 1000000, preferably 20000 to 500000, and the molecular weigh distribution (poly disperse index, PDI) of 2 to 3.5. According to this, the norbornene-based copolymer can be properly included in the alignment composition for forming the alignment layer and show superior coating property, and the alignment layer formed from the same can show superior liquid alignment property.

Meanwhile, the definitions of the substituent in the norbornene-based copolymer structure are as follows.

Firstly, the term "alkyl" means a $C_1$-$C_{20}$, preferably a $C_1$-$C_{10}$, more preferably a $C_1$-$C_6$ linear or branched saturated monovalent hydrocarbon part. The alkyl group comprehensively means not only the unsubstituted group but also the group substituted by a certain substituent disclosed below. For example, it may be methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl, and the like.

The term "alkenyl" means a $C_2$-$C_{20}$, preferably a $C_2$-$C_{10}$, more preferably a $C_2$-$C_6$ linear or branched saturated monovalent hydrocarbon part including one or more carbon-carbon double bond. The alkenyl group may be connected though a carbon atom including carbon-carbon double bond or a saturated carbon atom. The alkenyl group may comprehensively mean not only the unsubstituted group but also the group substituted by a certain substituent disclosed below.

For example, it may be ethenyl, 1-propenyl, 2-propenyl, 2-butenyl, 3-butenyl, pentenyl, 5-hexenyl, dodecenyl, and the like.

The term "cycloalkyl" means a $C_3$-$C_{12}$ saturated or unsaturated non-aromatic monovalent monocyclic, bicyclic, or tricyclic hydrocarbon part, and it may comprehensively mean the group substituted by a certain substituent disclosed below. For example, it may be cyclopropyl, cyclobutyl, cyclopentyl, cyclopentenyl, cyclohexyl, cyclohexenyl, cycloheptyl, cyclooctyl, decahydronaphthalenyl, adamantyl, norbornyl (namely, bicyclo[2,2,1]hept-5-enyl), and the like.

The term "aryl" means a $C_6$-$C_{40}$, preferably a $C_6$-$C_{12}$ monovalent monocyclic, bicyclic, or tricyclic aromatic hydrocarbon part, and it may comprehensively mean the group substituted by a certain substituent disclosed below. For example, it may be phenyl, naphthalenyl, fluorenyl, and the like.

The term "alkoxy aryl" means that one or more hydrogen of the aryl group defined above is substituted by an alkoxy group. For example, it may be methoxy phenyl, ethoxy phenyl, propoxy phenyl, butoxy phenyl, pentoxy phenyl, hexoxy phenyl, heptoxy phenyl, octoxy phenyl, nonoxy phenyl, methoxy biphenyl, methoxy naphthalenyl, methoxy fluorenyl, methoxy anthrathenyl, and the like.

The term "aralkyl" means that one or more hydrogen of the alkyl group defined above is substituted by an aryl group, and it may comprehensively mean the group substituted by a certain substituent disclosed below. For example, it may be benzyl, benzhydryl, trityl, and the like.

The term "alkynyl" means a $C_2$-$C_{20}$, preferably a $C_2$-$C_{10}$, more preferably a $C_2$-$C_6$ linear or branched saturated monovalent hydrocarbon part including one or more carbon-carbon triple bond. The alkynyl group may be connected though a carbon atom including carbon-carbon triple bond or a saturated carbon atom. The alkynyl group may comprehensively mean the group substituted by a certain substituent disclosed below also. For example, it may be ethynyl, propynyl, and the like.

The term "alkylene" means a $C_1$-$C_{20}$, preferably a $C_1$-$C_{10}$, more preferably a $C_1$-$C_6$ linear or branched saturated divalent hydrocarbon part. The alkylene group may comprehensively mean the group substituted by a certain substituent disclosed below also. For example, it may be methylene, ethylene, propylene, butylene, hexylene, and the like.

The term "alkenylene" means a $C_2$-$C_{20}$, preferably a $C_2$-$C_{10}$, more preferably a $C_2$-$C_6$ linear or branched saturated divalent hydrocarbon part including one or more carbon-carbon double bond. The alkenylene group may be connected though a carbon atom including carbon-carbon double bond and/or a saturated carbon atom. The alkenylene group may comprehensively mean the group substituted by a certain substituent disclosed below also.

The term "cycloalkylene" means a $C_3$-$C_{12}$ saturated or unsaturated non-aromatic divalent monocyclic, bicyclic, or tricyclic hydrocarbon part, and it may comprehensively mean the group substituted by a certain substituent disclosed below. For example, it may be cyclopropylene, cyclobutylene, and the like.

The term "arylene" means a $C_6$-$C_{40}$, preferably a $C_6$-$C_{12}$ divalent monocyclic, bicyclic, or tricyclic aromatic hydrocarbon part, and it may comprehensively mean the group substituted by a certain substituent disclosed below. The aromatic part includes only carbon atoms. For example, it may be phenylene, and the like.

The term "aralkylene" means a divalent part in which one or more hydrogen of the alkyl group defined above is substituted by an aryl group, and it may comprehensively mean the group substituted by a certain substituent disclosed below. For example, it may be benzylene, and the like.

The term "alkynylene" means a $C_2$-$C_{20}$, preferably a $C_2$-$C_{10}$, more preferably a $C_2$-$C_6$ linear or branched saturated divalent hydrocarbon part including one or more carbon-carbon triple bond. The alkynylene group may be connected though a carbon atom including carbon-carbon triple bond or a saturated carbon atom. The alkynyl group may comprehensively mean the group substituted by a certain substituent disclosed below also. For example, it may be ethynylene, propynylene, and the like.

The term "substituted or unsubstituted" functional group disclosed above comprehensively means not only the functional group itself but also the functional group substituted by a certain substituent. In this specification, examples of the substituent which can be introduced into the functional group may be a halogen, an alkyl, an alkenyl, an alkyntyl, a haloalkyl, a haloalkenyl, a haloalkynyl, an aryl, a haloaryl, an aralkyl, a haloaralkyl, an alkoxy, a haloalkoxy, a carbonyloxy, a halocarbonyloxy, an aryloxy, a haloaryloxy, a silyl, a siloxy, and the like.

Meanwhile, according to another embodiment of the present invention, a method of preparing the photo-reactive norbornene-based copolymer disclosed above is provided. Such method may include the step of polymerizing the monomers of Chemical Formulae 1 and 2 in the presence of a catalyst composition including a procatalyst including a transition metal of Group 10 and a cocatalyst.

At this time, the polymerization reaction may be carried out at the temperature of 10° C. to 200° C. When the reaction temperature is less than 10° C., it is undesirable because the polymerization activity may be low, and when the temperature is over 200° C., it is also undesirable because the catalyst may be decomposed.

Furthermore, the cocatalyst may include at least one selected from the group consisting of a first cocatalyst providing a lewis base which can make a coordinate bond with the metal of the procatalyst; and a second cocatalyst providing a compound including an electron donor ligand of Group 15. The cocatalyst may preferably be a catalyst mixture including the first cocatalyst providing the lewis base, and the second cocatalyst providing the compound including the neutral electron donor ligand of Group 15.

At this time, the catalyst mixture may include 1 to 1000 moles of the first cocatalyst and 1 to 1000 moles of the second cocatalyst per 1 mole of the total procatalyst. When the contents of the first cocatalyst and the second cocatalyst are excessively low, the catalyst may not be activated properly, conversely, when the contents are excessively high, the catalytic activity may decrease oppositely.

And, the compound having the lewis basic functional group which can easily participate in the lewis acid-base reaction and come away from the central metal may be used as the procatalyst including the transition metal of Group 10, so that it is easily separated by the first cocatalyst providing the lewis base and the central transition metal can be changed into the catalytic active species. For example, [(Allyl)Pd(Cl)]$_2$ (Allylpalladiumchloride dimer), $(CH_3CO_2)_2Pd$ [Palladium (II) acetate], $[CH_3COCH=C(O—)CH_3]_2Pd$ [Palladium (II) acetylacetonate], $NiBr(NP(CH_3)_3)_4$, [PdCl(NB)O(CH$_3$)]$_2$, and the like may be used.

As the first cocatalyst providing the lewis base which can form weak coordinate bond with the metal of the procatalyst, a compound which can react easily with the lewis base and form a vacant site of the transition metal, and form weak coordinate bond with the transition metal compound in order to stabilize the transition metal formed like this, or a compound providing the same may be used. For example, a borane such as $B(C_6F_5)_3$ or a borate such as dimethylanilinium tetrakis(pentafluorophenyl)borate, an alkyl aluminum such as methyl aluminoxane (MAO) or $Al(C_2H_5)_3$, a transition metal halide such as $AgSbF_6$, and the like may be used.

As the second cocatalyst providing the compound including an electron donor ligand of Group 15, an alkyl phosphine, a cycloalkyl phosphine, a phenyl phosphine, and the like may be used.

The first cocatalyst and the second cocatalyst may be used separately, however, it is also possible to make these cocatalysts into a salt and to use the salt as the compound for activating the catalyst. For example, the compound formed by ionic bonds of an alkyl phosphine and a borane or borate compound may be used.

Meanwhile, according to still another embodiment of the present invention, an alignment layer including the photo-reactive norbornene-based copolymer disclosed above is provided. The alignment layer includes not only membrane types but also an alignment film types comprehensively.

Such alignment layer may be prepared by using ingredients and preparing methods well known in the related art, except that the photo-reactive norbornene-based copolymer disclosed above is included.

For example, the alignment layer may be formed by mixing the norbornene-based copolymer, a binder resin, and a photo-initiator, dissolving the same in an organic solvent to obtain the composition for alignment, and coating the composition on a substrate and UV-curing the same.

At this time, an acrylate-based resin, for example, a polyfunctional acrylate-based monomer, oligomer, or polymer including 2 or more acrylate functional groups may be used as the binder resin, and more concretely, pentaerythritol triacrylate, dipentaerythritol hexaacrylate, trimethylolpropane triacrylate, tris(2-acryloyloxyethyl) isocyanurate, and the like may be used.

As the photo-initiator, common photo-initiators known for the alignment layer may be used unlimitedly, for example, the photo-initiators known by the product name of Irgacure 907, and 819 may be used.

As the organic solvent, methylene chloride (MC), toluene, N-methylpyrrolidone (NMP), anisole, chlorobenzene, dichloroethane, cyclohexane, cyclopentane, propyleneglycol methylether acetate (PGMEA), and the like may be used. Since the photo-reactive norbornene-based copolymer shows superior solubility to various organic solvents, various other organic solvents in addition to the solvents disclose above may be used unlimitedly.

In the composition for alignment, the solid content including the norbornene-based copolymer, the binder resin, and the photo-initiator may be 1 to 15 weight %, and it is preferable that the content is 10 to 15 weight % for casting the alignment layer in a film form, and the content is 1 to 5 weight % for forming the layer in a membrane form.

The alignment layer formed like this may be formed on the substrate and below the liquid crystal as exemplarily illustrated in the drawing, and may align the liquid crystal. At this time, a substrate including a cyclic polymer, a substrate including an acryl polymer, or a substrate including a cellulose polymer may be used as the substrate, and the alignment layer may be formed by coating the composition for alignment on the substrate with various methods of bar-coating, spin-coating, blade-coating, and the like, and curing the same with a UV ray.

The alignment layer may be applied to an optical film or an optical filter for realizing stereo-scopic image.

According to still another embodiment of the present invention, a display device including the alignment layer is provided. The display device may be a LCD device in which the alignment layer is included for aligning the liquid crystal, or a stereo-scopic image display device of which the optical film or the optical filter for realizing stereo-scopic image includes the alignment layer. Since the components of the display devices, except that the photo-reactive norbornene-based copolymer and the alignment layer are included therein, are same as in common devices, detailed explanations about the components are omitted here.

Hereinafter, preferable examples of the present invention are provided for easy understanding. However, the following examples are only for explaining the present invention and the present invention is not limited to or by them.

In the following examples, all of the operations dealing with the compound sensitive to air or water were carried out by using a standard Schlenk technique or a dry box technique. The nuclear magnetic resonance (NMR) spectrum were obtained by using Bruker 300 spectrometer. $^1H$ NMR was measured at 300 MHz, and $^{13}C$ NMR was measured at 75 MHz at this time. The molecular weight and the molecular weight distribution of the ring-opening hydrogenated polymer were measured by using a gel permeation chromatography (GPC), and a polystyrene sample was used as a standard.

Toluene was distilled and purified in potassium/benzophenone, and dichloromethane was distilled and purified in $CaH_2$.

Preparation Example 1

Preparation of
5-norbornene-2-methyl-(4-fluoro-cinnamate)

4-Fluoro benzaldehyde (10 g, 80.6 mol), malonic acid (29.5 g, 2 equivalents), and piperidine (1.21 g, 0.1 equivalents) were introduced in pyridine (33.7 g, 3 equivalents), and stirred at room temperature for about 1 hour. After elevating the temperature to 80° C., the solution was stirred for 12 hours. After the reaction, the temperature was decreased to room temperature, and the solution was titrated to have pH of about 4.0 by adding 1M HCl slowly. The prepared powder was filtered, washed with water, and dried in a vacuum oven.

4-Fluoro cinnamic acid (10 g, 60 mmol) obtained above was introduced in 50 ml of toluene in company with 5-norbornene-2-methanol (7.45 g, 60 mol) and zirconium acetate hydroxide (0.3 g, 0.02 equivalents), and the solution was stirred. The temperature was elevated to 145° C. under nitrogen atmosphere, and then axeotropic reflux was carried out to the solution for 24 hours. After the reaction, the temperature was decreased to room temperature, and 100 volume % of ethyl acetate was added. After extracting the product with 1M HCl, and the product was washed once more with water. The organic layer was dried by using sodium sulfate, and high viscose liquid material was obtained after eliminating the solvent: yield 73%, purity (GC) 98%.

Preparation Example 2

Preparation of 5-norbornene-2-methyl-cinnamate

Benzaldehyde (10 g, 93.3 mol), malonic acid (33 g, 2 equivalents), and piperidine (1.33 g, 0.1 equivalents) were introduced in pyridine (37 g, 3 equivalents), and stirred at room temperature for about 1 hour. After elevating the temperature to 80° C., the solution was stirred for 12 hours. After the reaction, the temperature was decreased to room temperature, and the solution was titrated to have pH of about 4.0 by adding 1M HCl slowly. The prepared powder was filtered, washed with water, and dried in a vacuum oven.

Cinnamic acid (8 g, 60 mmol) obtained above was introduced in 50 ml of toluene in company with 5-norbornene-2-methanol (7.45 g, 60 mol) and zirconium acetate hydroxide (0.3 g, 0.02 equivalents), and the solution was stirred. The temperature was elevated to 145° C. under nitrogen atmosphere, and then axeotropic reflux was carried out to the solution for 24 hours. After the reaction, the temperature was decreased to room temperature, and 100 volume % of ethyl acetate was added. After extracting the product with 1M HCl, and the product was washed once more with water. The organic layer was dried by using sodium sulfate, and high viscose liquid material was obtained after eliminating the solvent: yield 75%, purity (GC) 97%.

Preparation Example 3

Preparation of 5-norbornene-2-methyl-(4-methoxy-cinnamate)

4-Methoxy-benzaldehyde (12.7 g, 93.3 mol), malonic acid (33 g, 2 equivalents), and piperidine (1.33 g, 0.1 equivalents) were introduced in pyridine (37 g, 3 equivalents), and stirred at room temperature for about 1 hour. After elevating the temperature to 80° C., the solution was stirred for 12 hours. After the reaction, the temperature was decreased to room temperature, and the solution was titrated to have pH of about 4.0 by adding 1M HCl slowly. The prepared powder was filtered, washed with water, and dried in a vacuum oven.

4-Methoxy-cinnamic acid (9 g, 60 mmol) obtained above was introduced in 50 ml of toluene in company with 5-norbornene-2-methanol (7.45 g, 60 mol) and zirconium acetate hydroxide (0.3 g, 0.02 equivalents), and the solution was stirred. The temperature was elevated to 145° C. under nitrogen atmosphere, and then axeotropic reflux was carried out to the solution for 24 hours. After the reaction, the temperature was decreased to room temperature, and 100 volume % of ethyl acetate was added. After extracting the product with 1M HCl, and the product was washed once more with water. The organic layer was dried by using sodium sulfate, and high viscose liquid material was obtained after eliminating the solvent: yield 80%, purity (GC) 98%.

Comparative Example 1

Preparation of poly[5-norbornene-2-methyl-(4-fluoro-cinnamate)]

5-norbornene-2-methyl-(4-fluoro-cinnamate) (5 g, 18.4 mmol) obtained in Preparation Example 1 was dissolved in 50 ml of toluene, and the solution was stirred with blowing nitrogen gas. After elevating the temperature to 90° C., $Pd(OAc)_2$ (4.13 mg, 18.4 mol) and tris(cyclohexyl) phosphine tetrakis(pentafluorobenz) borate (37.2 mg, 38.6 μmol) dissolved in methylene chloride were added therein, and the solution was reacted at 90° C. for 15 hours with stirring.

The temperature was decreased to room temperature after the reaction, and the precipitates were obtained by using ethanol, filtered, and dried in a vacuum oven (Mw=150,000, PDI=2.91, yield=90%).

Comparative Example 2

Preparation of poly[5-norbornene-2-methyl-cinnamate]

Poly[5-norbornene-2-methyl-cinnamate] was prepared substantially according to the same method as in Comparative Example 1, except that 5-norbornene-2-methyl-cinnamate obtained in Preparation Example 2 was used as the monomer (Mw=142,000, PDI=2.55, yield=84%).

Example 1

Preparation of copolymer of 5-norbornene-2-methyl-(4-fluoro-cinnamate) and 5-norbornene-2-methyl-cinnamate (mole ratio=95:5)

The copolymer in the title was prepared substantially according to the same method as in Comparative Example 1, except that 5-norbornene-2-methyl-(4-fluoro-cinnamate) (10 g, 36.7 mmol) obtained in Preparation Example 1 and 5-norbornene-2-methyl-cinnamate (0.58 g, 1.93 mmol) obtained in Preparation Example 2 were used as the monomers (Mw=153,000, PDI=2.79, yield=85%).

Example 2

Preparation of copolymer of 5-norbornene-2-methyl-(4-fluoro-cinnamate) and 5-norbornene-2-methyl-cinnamate (mole ratio=90:10)

The copolymer in the title was prepared substantially according to the same method as in Comparative Example 1, except that 5-norbornene-2-methyl-(4-fluoro-cinnamate) (10 g, 36.7 mmol) obtained in Preparation Example 1 and 5-norbornene-2-methyl-cinnamate (1.21 g, 4 mmol) obtained in Preparation Example 2 were used as the monomers (Mw=148,000, PDI=2.58, yield=79%).

Example 3

Preparation of copolymer of 5-norbornene-2-methyl-(4-fluoro-cinnamate) and 5-norbornene-2-methyl-cinnamate (mole ratio=70:30)

The copolymer in the title was prepared substantially according to the same method as in Comparative Example 1, except that 5-norbornene-2-methyl-(4-fluoro-cinnamate) (10 g, 36.7 mmol) obtained in Preparation Example 1 and 5-norbornene-2-methyl-cinnamate (4.68 g, 15.7 mmol) obtained in Preparation Example 2 were used as the monomers (Mw=149,000, PDI=2.44, yield=86%).

Example 4

Preparation of copolymer of 5-norbornene-2-methyl-(4-fluoro-cinnamate) and 5-norbornene-2-methyl-cinnamate (mole ratio=50:50)

The copolymer in the title was prepared substantially according to the same method as in Comparative Example 1, except that 5-norbornene-2-methyl-(4-fluoro-cinnamate) (10 g, 36.7 mmol) obtained in Preparation Example 1 and 5-norbornene-2-methyl-cinnamate (10.9 g, 36.7 mmol) obtained in Preparation Example 2 were used as the monomers (Mw=132,000, PDI=2.15, yield=81%).

Example 5

Preparation of copolymer of 5-norbornene-2-methyl-(4-fluoro-cinnamate) and 5-norbornene-2-methyl-(4-methoxy-cinnamate) (mole ratio=95:5)

The copolymer in the title was prepared substantially according to the same method as in Comparative Example 1, except that 5-norbornene-2-methyl-(4-fluoro-cinnamate) (10 g, 36.7 mmol) obtained in Preparation Example 1 and 5-norbornene-2-methyl-(4-methoxy-cinnamate) (0.55 g, 1.93 mmol) obtained in Preparation Example 3 were used as the monomers (Mw=158,000, PDI=2.95, yield=75%)

Example 6

Preparation of copolymer of 5-norbornene-2-methyl-(4-fluoro-cinnamate) and 5-norbornene-2-methyl-(4-methoxy-cinnamate) (mole ratio=90:10)

The copolymer in the title was prepared substantially according to the same method as in Comparative Example 1, except that 5-norbornene-2-methyl-(4-fluoro-cinnamate) (10 g, 36.7 mmol) obtained in Preparation Example 1 and 5-norbornene-2-methyl-(4-methoxy-cinnamate) (1.1 g, 4 mmol) obtained in Preparation Example 3 were used as the monomers (Mw=147,000, PDI=3.12, yield=79%).

Example 7

Preparation of copolymer of 5-norbornene-2-methyl-(4-fluoro-cinnamate) and 5-norbornene-2-methyl-(4-methoxy-cinnamate) (mole ratio=70:30)

The copolymer in the title was prepared substantially according to the same method as in Comparative Example 1, except that 5-norbornene-2-methyl-(4-fluoro-cinnamate) (10 g, 36.7 mmol) obtained in Preparation Example 1 and 5-norbornene-2-methyl-(4-methoxy-cinnamate) (4.46 g, 15.7 mmol) obtained in Preparation Example 3 were used as the monomers (Mw=131,000, PDI=2.84, yield=82%).

Example 8

Preparation of copolymer of 5-norbornene-2-methyl-(4-fluoro-cinnamate) and 5-norbornene-2-methyl-(4-methoxy-cinnamate) (mole ratio=50:50)

The copolymer in the title was prepared substantially according to the same method as in Comparative Example 1, except that 5-norbornene-2-methyl-(4-fluoro-cinnamate) (10 g, 36.7 mmol) obtained in Preparation Example 5-norbornene-2-methyl-(4-methoxy-cinnamate) (10.4 g, 36.7 mmol) obtained in Preparation Example 3 were used as the monomers (Mw=138,000, PDI=3.01, yield=80%).

Example 9

Preparation of copolymer of 5-norbornene-2-methyl-(4-fluoro-cinnamate) and 5-norbornene-2-methyl-(4-methoxy-cinnamate) (mole ratio=30:70)

The copolymer in the title was prepared substantially according to the same method as in Comparative Example 1, except that 5-norbornene-2-methyl-(4-fluoro-cinnamate) (10 g, 36.7 mmol) obtained in Preparation Example 1 and 5-norbornene-2-methyl-(4-methoxy-cinnamate) (24.3 g, 85.6 mmol) obtained in Preparation Example 3 were used as the monomers (Mw=125,000, PDI=3.17, yield=83%).

Example 10

Preparation of copolymer of 5-norbornene-2-methyl-(4-fluoro-cinnamate) and 5-norbornene-2-methyl-(4-methoxy-cinnamate) (mole ratio=10:90)

The copolymer in the title was prepared substantially according to the same method as in Comparative Example 1, except that 5-norbornene-2-methyl-(4-fluoro-cinnamate) (10 g, 36.7 mmol) obtained in Preparation Example 1 and 5-norbornene-2-methyl-(4-methoxy-cinnamate) (9.38 g, 33 mmol) obtained in Preparation Example 3 were used as the monomers (Mw=116,000, PDI=2.87, yield=75%).

Experimental Example 1

Evaluation on Solubility and Adhesive Strength

Each polymer of Comparative Example 1, and Examples 1 to 10 was dissolved in MC, toluene, NMP, and PGMEZ solvents in the ratio of polymer 1 g/solvent 9 g, respectively, and the dissolving times were compared so as to compare and evaluate the solubility. The degree of solubility is represented by an integer of 1 to 5, and the integer near to 5 represents that the dissolving time is short and the dissolving speed is fast, and thus the solubility is superior.

Subsequently, each copolymer of Comparative Example 1, and Examples 1 to 10 was dissolved in cyclopentanone in the amount of 2 weight %, and a film was formed on a COP (cycloolefin-based drawn film) substrate by bar-coating the solution on the substrate, drying the same at 80° C. for 2 minutes, and radiating a UV ray of 200 mJ thereto. The adhesive strength was tested by making 100 grids of 2 cm×2 cm size with a knife, and peeling off the grid with a cellophane tape (Scotch® Tape). The degree of adhesive strength is represented by an integer of 1 to 5, and the integer near to 5 represents strong adhesive strength.

The results of evaluation of the solubility and the adhesive strength are listed in the following Table 1.

TABLE 1

| Used Polymer | Solubility | | | | Adhesive Strength |
|---|---|---|---|---|---|
| | MC | Toluene | NMP | PGMEA | |
| Comparative Example 1 | 1 | 1 | 1 | 1 | 1 |
| Example 1 | 2 | 2 | 2 | 1 | 2 |
| Example 2 | 3 | 3 | 2 | 2 | 2 |
| Example 3 | 3 | 3 | 3 | 3 | 3 |
| Example 4 | 4 | 4 | 4 | 3 | 3 |
| Example 5 | 4 | 4 | 3 | 2 | 2 |
| Example 6 | 4 | 4 | 3 | 2 | 3 |
| Example 7 | 4 | 4 | 3 | 3 | 4 |
| Example 8 | 5 | 5 | 4 | 3 | 5 |
| Example 9 | 5 | 5 | 4 | 4 | 5 |
| Example 10 | 5 | 5 | 5 | 4 | 5 |

Referring to Table 1, it is recognized that the polymers of the Examples show superior solubility to various solvents and excellent adhesive strength to the substrate in comparison with the polymer of Comparative Example 1, as they include the monomers having the functional group of methoxy or hydrogen.

Experimental Example 2

Evaluation on Alignment Property

Subsequently, each copolymer of Comparative Example 2, and Examples 1 to 10 was dissolved in cyclopentanone in the amount of 2 weight %, and a film was formed on a COP (cycloolefin-based drawn film) substrate by bar-coating the solution on the substrate, drying the same at 80° C. for 2 minutes, and radiating a UV ray of 200 mJ thereto. The liquid crystal for A-plate was coated on the alignment layer prepared like above, dried at 60° C. for 2 minutes, and cured by radiating a UV ray of 50 mJ. After inserting the film between polarizing plates, the degree of alignment was checked. The degree of alignment is also represented by an integer of 1 to 5, and the integer near to 5 represents superior alignment property.

The evaluation results on the alignment property are listed in the following Table 2.

TABLE 2

| Used Polymer | Alignment Property |
|---|---|
| Comparative Example 2 | 3 |
| Example 1 | 5 |
| Example 2 | 5 |
| Example 3 | 4 |
| Example 4 | 4 |
| Example 5 | 5 |
| Example 6 | 5 |
| Example 7 | 5 |
| Example 8 | 5 |
| Example 9 | 4 |
| Example 10 | 4 |

Referring to Table 2, it is recognized that the polymers of the Examples show superior alignment property in comparison with the polymer of Comparative Example 1, as they include the monomers having the functional group of fluorine.

What is claimed is:

1. A photo-reactive norbornene-based copolymer, including repeating units derived from the following compounds of Chemical Formulae 1 and 2 as monomers:

[Chemical Formula 1]

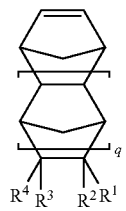

[Chemical Formula 2]

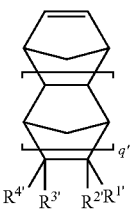

in Chemical Formulae 1 and 2, q and q' are integers of 0 to 4, at least one of R1, R2, R3, and R4 is a radical selected from the group consisting of the compounds represented by the following Chemical Formulae 1a and 1b, at least one of R1', R2', R3', and R4' is a radical represented by the following Chemical Formula 2a, R1 to R4, and R1' to R4' except the radicals of Chemical Formulae 1a, 1b, and 2a are same or different each other, and independently selected from the group consisting of hydrogen; a halogen; a substituted or unsubstituted $C_1$-$C_{20}$ linear or branched alkyl; a substituted or unsubstituted $C_2$-$C_{20}$ linear or branched alkenyl; a substituted or unsubstituted $C_2$-$C_{20}$ linear or branched alkynyl; a substituted or unsubstituted $C_3$-$C_{12}$ cycloalkyl; a substituted or unsubstituted $C_6$-$C_{40}$ aryl; and a polar group including at least one selected from oxygen, nitrogen, phosphorus, sulfur, silicon, and boron, and when R1 to R4, and R1' to R4' are not hydrogen; halogen; or polar group, at least one combination selected from the group consisting of R1 and R2, R1' and R2', R3 and R4, and R3' and R4' may be connected each other so as to form a $C_1$-$C_{10}$ alkylidene group; or R1 or R2 may be connected to any one of R3 and R4, or R1' or R2' may be connected to any one of R3' and R4' so as to form a $C_4$-$C_{12}$ saturated or unsaturated aliphatic ring or a $C_6$-$C_{24}$ aromatic ring:

[Chemical Formula 1a]

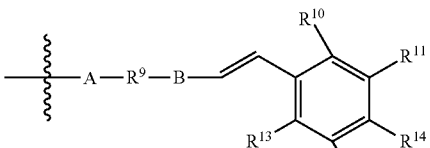

[Chemical Formula 1b]

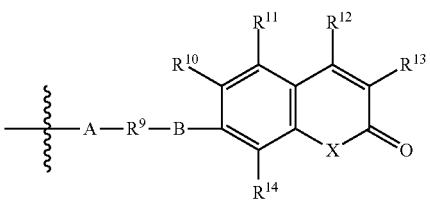

[Chemical Formula 2a]

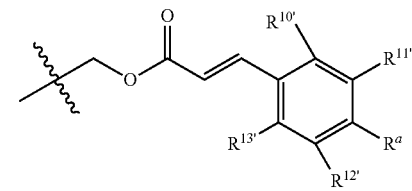

in Chemical Formulae 1a, 1b, and 2a,

A is a chemical bond, oxygen, sulfur, or —NH—,

B is selected from the group consisting of a chemical bond, a substituted or unsubstituted $C_1$-$C_{20}$ alkylene, a carbonyl group, a carboxyl group, an ester, a substituted or unsubstituted $C_6$-$C_{40}$ arylene, and a substituted or unsubstituted $C_6$-$C_{40}$ hetero arylene, X is oxygen or sulfur, R9 is selected from the group consisting of a chemical bond, a substituted or unsubstituted $C_1$-$C_{20}$ alkylene, a substituted or unsubstituted $C_2$-$C_{20}$ alkenylene, a substituted or unsubstituted $C_3$-$C_{12}$ cycloalkylene; a substituted or unsubstituted $C_6$-$C_{40}$ arylene; a substituted or unsubstituted $C_7$-$C_{15}$ aralkylene, and a substituted or unsubstituted $C_2$-$C_{20}$ alkynylene, Ra is hydrogen or methoxy, at least one of R10, R11, R12, R13, and R14 is a halogen or a halogen-substituted $C_1$-$C_{20}$ alkyl, and the rest of R10 to R14, and R10' to R13' are same or different each other, and independently selected from the group consisting of hydrogen, a substituted or unsubstituted $C_1$-$C_{20}$ alkyl; a substituted or unsubstituted $C_1$-$C_{20}$ alkoxy; a substituted or unsubstituted $C_6$-$C_{30}$ aryloxy; a substituted or unsubstituted $C_6$-$C_{40}$ aryl; a $C_6$-$C_{40}$ hetero aryl including a hetero atom of Group 14, 15, or 16; and a substituted or unsubstituted $C_6$-$C_{40}$ alkoxyaryl, with the proviso that the rest of R10 to R14 in the Chemical Formula 1b are not hydrogen.

2. The photo-reactive norbornene-based copolymer according to claim 1, wherein the halogen in Chemical Formulae 1a and 1b is selected from the group consisting of fluorine, chlorine, bromine, and iodine.

3. The photo-reactive norbornene-based copolymer according to claim 1, wherein R1 in Chemical Formula 1 and R1' in Chemical Formula 2 are represented by Chemical Formula 1a and Chemical Formula 2a, respectively.

4. The photo-reactive norbornene-based copolymer according to claim 3, wherein at least one of R10, R11, R12, R13, and R14 in Chemical Formula 1a is fluorine, or a fluorine-substituted $C_1$-$C_{20}$ alkyl.

5. The photo-reactive norbornene-based copolymer according to claim 1, wherein the polar group is selected from the following functional groups:

—$R_5OR_6$, —$OR_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$, —$R_5OC(O)R_6$, —$(R_5O)_p$—$OR_6$, —$(OR_5)_p$—$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$—, —$R_5C(=S)SR_6$, —$R_5SO_3R_6$, —$SO_3R_6$, —$R_5N=C=S$, —$N=C=S$, —$NCO$, —$R_5$—$NCO$, —$CN$, —$R_5CN$, —$NNC(=S)R_6$, —$R_5NNC(=S)R_6$, —$NO_2$, —$R_5NO_2$,

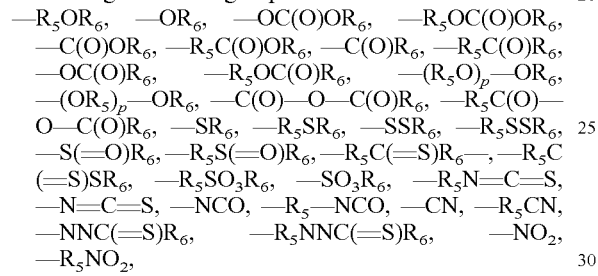

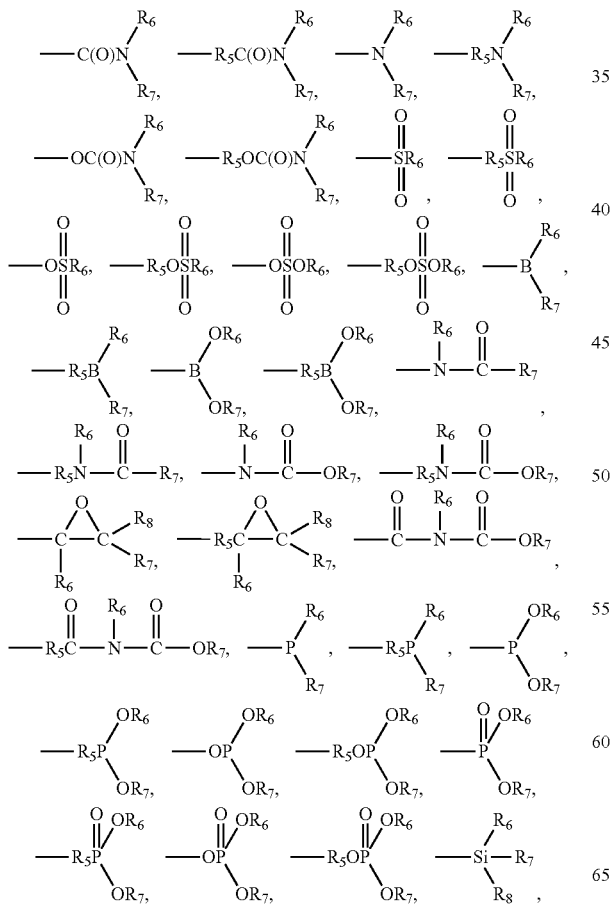

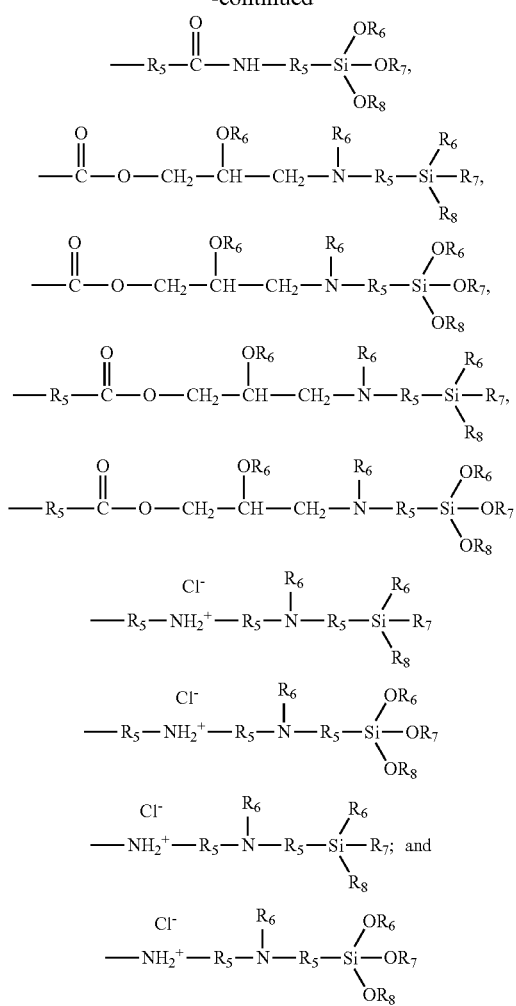

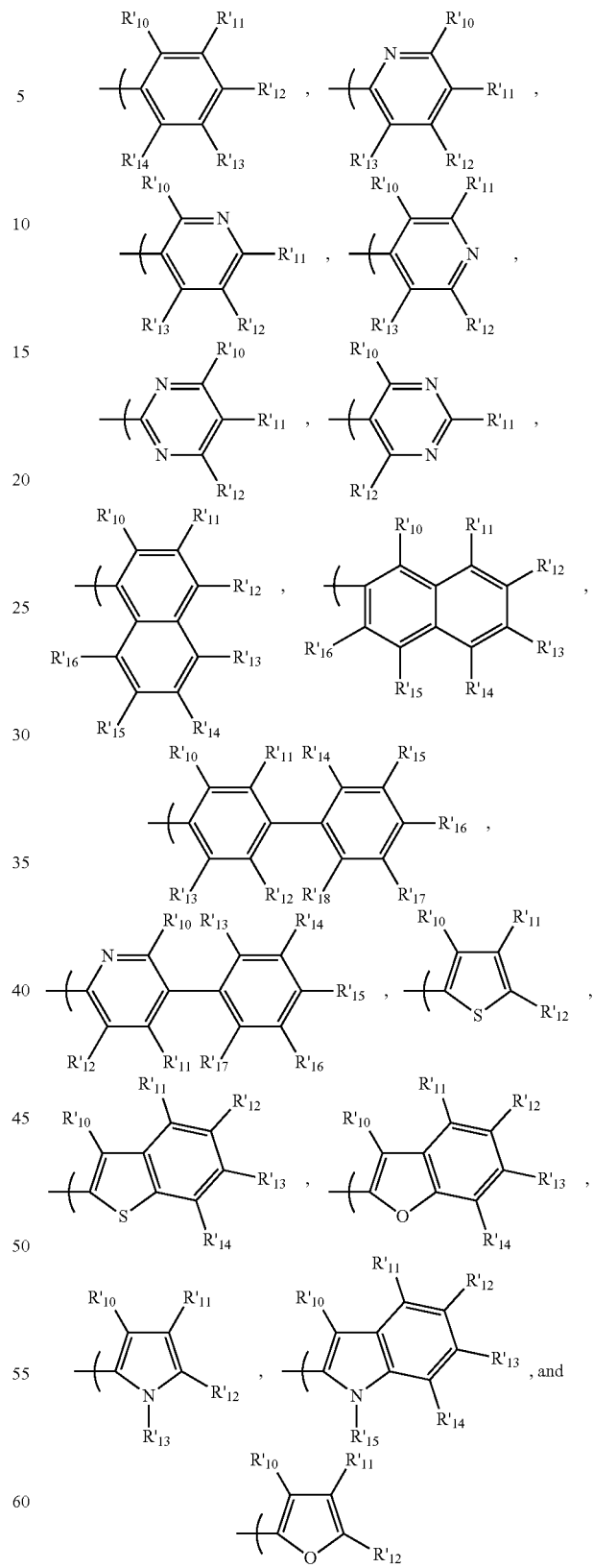

in the functional groups, p is independently an integer of 1 to 10,

R5 is a substituted or unsubstituted $C_1$-$C_{20}$ linear or branched alkylene; a substituted or unsubstituted $C_2$-$C_{20}$ linear or branched alkenylene; a substituted or unsubstituted $C_2$-$C_{20}$ linear or branched alkynylene; a substituted or unsubstituted $C_3$-$C_{12}$ cycloalkylene; a substituted or unsubstituted $C_6$-$C_{40}$ arylene; a substituted or unsubstituted $C_1$-$C_{20}$ carbonyloxylene; or a substituted or unsubstituted $C_1$-$C_{20}$ alkoxylene, and R6, R7, and R8 are independently selected from the group consisting of hydrogen; a halogen; a substituted or unsubstituted $C_1$-$C_{20}$ linear or branched alkyl; a substituted or unsubstituted $C_2$-$C_{20}$ linear or branched alkenyl; a substituted or unsubstituted $C_2$-$C_{20}$ linear or branched alkynyl; a substituted or unsubstituted $C_3$-$C_{12}$ cycloalkyl; a substituted or unsubstituted $C_6$-$C_{40}$ aryl; a substituted or unsubstituted $C_1$-$C_{20}$ alkoxy; and a substituted or unsubstituted $C_1$-$C_{20}$ carbonyloxy.

6. The photo-reactive norbornene-based copolymer according to claim 1, wherein the substituted or unsubstituted $C_6$-$C_{40}$ aryl; or the $C_6$-$C_{40}$ hetero aryl including a hetero atom of Group 14, 15, or 16 is selected from the group consisting of the following functional groups:

in the functional groups, R'10 to R'18 are same or different each other, and the rests are independently selected from the group consisting of a substituted or unsubstituted $C_1$-$C_{20}$ linear or branched alkyl; a substituted or unsubstituted $C_1$-$C_{20}$ alkoxy; a substituted or unsubstituted $C_6$-$C_{30}$ aryloxy; and a substituted or unsubstituted $C_6$-$C_{40}$ aryl.

7. The photo-reactive norbornene-based copolymer according to claim 1, wherein the mole ratio of the repeating unit derived from the monomer of Chemical Formula 1:the repeating unit derived from the monomer of Chemical Formula 2 is 3:97 to 97:3.

8. The photo-reactive norbornene-based copolymer according to claim 1, including the repeating units of Chemical Formulae 3 and 4:

[Chemical Formula 3]

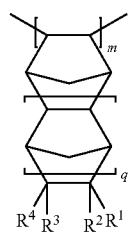

[Chemical Formula 4]

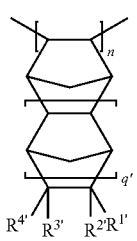

wherein, m and n is independently 50 to 5000, q, q', R1 to R4, and R1' to R4' are same as defined in Chemical Formulae 1 and 2.

9. The photo-reactive norbornene-based copolymer according to claim 1, wherein the weight average molecular weight is 10000 to 1000000.

10. A method of preparing the photo-reactive norbornene-based copolymer of claim 1, including the step of polymerizing the monomers of Chemical Formulae 1 and 2 in the presence of a catalyst composition including a procatalyst including a transition metal of Group 10 and a cocatalyst.

11. The method of preparing the photo-reactive norbornene-based copolymer according to claim 10, wherein the cocatalyst includes one or more selected from the group consisting of a first cocatalyst providing a lewis base which can make a coordinate bond with the metal of the procatalyst; and a second cocatalyst providing a compound including an electron donor ligand of Group 15.

12. A composition for alignment, including the photo-reactive norbornene-based copolymer according to claim 1; a binder resin; a photo-initiator; and an organic solvent.

13. The composition for alignment according to claim 12, wherein the binder resin includes an acrylate-based resin.

14. The composition for alignment according to claim 12, wherein the organic solvent includes one or more selected from the group consisting of methylene chloride (MC), toluene, N-methylpyrrolidone (NMP), anisole, chlorobenzene, dichloroethane, cyclohexane, cyclopentane, and propyleneglycol methylether acetate (PGMEA).

15. An alignment layer, including the photo-reactive norbornene-based copolymer according to claim 1.

16. A display device, including the alignment layer of claim 15.

* * * * *